US011317234B2

(12) United States Patent
Roussel et al.

(10) Patent No.: US 11,317,234 B2
(45) Date of Patent: Apr. 26, 2022

(54) METHOD FOR THE SPATIALIZED SOUND REPRODUCTION OF A SOUND FIELD WHICH IS SELECTIVELY AUDIBLE IN A SUB-AREA OF AN AREA

(71) Applicant: ORANGE, Issy-les-Moulineaux (FR)

(72) Inventors: Georges Roussel, Chatillon (FR); Rozenn Nicol, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 17/254,293

(22) PCT Filed: Jun. 26, 2019

(86) PCT No.: PCT/FR2019/051568
§ 371 (c)(1),
(2) Date: Dec. 20, 2020

(87) PCT Pub. No.: WO2020/002829
PCT Pub. Date: Jan. 2, 2020

(65) Prior Publication Data
US 2021/0185468 A1    Jun. 17, 2021

(30) Foreign Application Priority Data

Jun. 28, 2018  (FR) ...................................... 1855876

(51) Int. Cl.
*H04S 7/00*       (2006.01)
*H04R 5/02*       (2006.01)
(Continued)

(52) U.S. Cl.
CPC .............. *H04S 7/303* (2013.01); *H04R 5/02* (2013.01); *H04R 5/04* (2013.01); *H04R 29/002* (2013.01);
(Continued)

(58) Field of Classification Search
CPC .. H04S 7/303; H04S 2400/15; H04S 2420/01; H04R 5/02; H04R 5/04; H04R 29/002; G01S 19/51
See application file for complete search history.

(56) References Cited

U.S. PATENT DOCUMENTS

| 2010/0284544 A1* | 11/2010 | Kim .......................... H04S 7/30 381/56 |
| 2018/0027350 A1 | 6/2018 | Buerger et al. |
| 2019/0208315 A1* | 7/2019 | Maeno .................. G10K 11/178 |

FOREIGN PATENT DOCUMENTS

| WO | 2016180493 A1 | 11/2016 |
| WO | 2018001490 A1 | 1/2018 |
| WO | 2018106163 A1 | 6/2018 |

OTHER PUBLICATIONS

International Search Report dated Oct. 14, 2019 for corresponding International Application No. PCT/FR2019/051568, filed Jun. 26, 2019.

(Continued)

*Primary Examiner* — Andrew L Sniezek
(74) *Attorney, Agent, or Firm* — David D. Brush; Westman, Champlin & Koehler, P.A.

(57) ABSTRACT

A method for spatialized sound reproduction using an array of loudspeakers, to generate a chosen sound field selectively audible in a first predetermined sub-area of an area covered by the loudspeakers, the area further including a second sub-area in which the chosen sound field is inaudible. The loudspeakers are supplied with respective control signals so that each one continuously emits an audio signal. The method includes, iteratively and continuously: estimating a sound pressure in the second sub-area as a function of the respective control signals of the loudspeakers, and of a respective initial weight of the control signals; calculating an error between the estimated sound pressure and a target (Continued)

sound pressure in the second sub-area; and, calculating and applying respective weights to the control signals, based on the error. The sound pressure in the second sub-area is calculated again based on the respective weighted control signals of the loudspeakers.

13 Claims, 4 Drawing Sheets

(51) Int. Cl.
*H04R 5/04* (2006.01)
*H04R 29/00* (2006.01)
*G01S 19/51* (2010.01)
(52) U.S. Cl.
CPC .......... *G01S 19/51* (2013.01); *H04S 2400/15* (2013.01); *H04S 2420/01* (2013.01)

(56) References Cited

OTHER PUBLICATIONS

Written Opinion of the International Searching Authority dated Oct. 14, 2019 for corresponding International Application No. PCT/FR2019/051568, filed Jun. 26, 2019.
Nelson et al., "Adaptive Inverse Filters for Stereophonic Sound Reproduction", IEEE Transactions on Signal Processing, IEEE Service Center, New York, NY, US, vol. 40, No. 7, Jul. 1, 1992 (Jul. 1, 1992_, pp. 1621-1632, XP000307653.
English translation of the Written Opinion of the International Searching Authority dated Oct. 14, 2019 for corresponding International Application No. PCT/FR2019/051568, filed Jun. 26, 2019.
Betlehem, T., et al., "Personal Sound Zones: Delivering interface-free audio to multiple listeners", IEEE, No. 1053-5888/15, p. 81-91, DOI: 10.1109/MSP.2014.2360707, Mar. 2015.

* cited by examiner

METHOD FOR THE SPATIALIZED SOUND REPRODUCTION OF A SOUND FIELD WHICH IS SELECTIVELY AUDIBLE IN A SUB-AREA OF AN AREA

CROSS-REFERENCE TO RELATED APPLICATIONS

This Application is a Section 371 National Stage Application of International Application No. PCT/FR2019/051568, filed Jun. 26, 2019, the content of which is incorporated herein by reference in its entirety, and published as WO 2020/002829 on Jan. 2, 2020, not in English.

FIELD OF THE DISCLOSURE

The invention relates to the field of spatialized audio and the control of sound fields. The aim of the method is to reproduce different sound fields in a same area, using the same system of loudspeakers. More specifically, the method seeks to render a sound field audible in a first sub-area and inaudible in a second sub-area. The method is based in particular on maximizing the contrast in sound level between the two sub-areas of the area.

BACKGROUND OF THE DISCLOSURE

Currently, methods for controlling sound fields allow achieving a high contrast in sound level between different listening areas. However, they do not take into account the sound field induced in the sub-area in which the sound field is to be rendered inaudible. Indeed, the target sound field to be reproduced in this sub-area is characterized by zero sound pressure. Thus, by disregarding the induced sound field, the sound field actually reproduced in this sub-area is never characterized by zero sound pressure, although the contrast in sound level between the two sub-areas is very great. Known in particular is the document "Personal Sound Zones: Delivering interface-free audio to multiple listeners", T. Betlehem, W. Zhang, M. A. Poletti, and T. Abhayapala, IEEE, no. 1053-5888/15, p. 81-91, March 2015. Such methods fail to achieve a homogeneous sound field over the entire sub-area in which the sound field is not to be reproduced.

SUMMARY

The present invention improves the situation.

To this end, it proposes a method, assisted by computer means, for spatialized sound reproduction using an array of loudspeakers, with a view to generating a chosen sound field which is selectively audible in a predetermined sub-area of an area covered by the loudspeakers, said area further comprising a second sub-area in which the aim is to render said chosen sound field inaudible, wherein, the loudspeakers being supplied with respective control signals so that each one continuously emits an audio signal, the method iteratively and continuously comprises:

estimating a sound pressure in the second sub-area, at least as a function of the respective control signals of the loudspeakers, and of a respective initial weight of the control signals of the loudspeakers, calculating an error between the estimated sound pressure and a target sound pressure desired in the second sub-area, and, calculating and applying respective weights to the control signals of the loudspeakers on the basis of said error, the sound pressure in the second sub-area being calculated once again, on the basis of the respective weighted control signals of the loudspeakers, each respective weight applied to a loudspeaker (HP1, . . . , HPN) comprising a first term corresponding to a respective weight calculated in a previous iteration and a second term which is a function of the error.

The method is not based solely on the desired sound contrast between the sound level of the two sub-areas. This makes it possible, at each iteration, to take into account the sound field actually created in the second sub-area. Thus, at each new iteration, the control signals of the loudspeakers are gradually weighted such that the sound field in the second sub-area, characterized by its sound pressure, reaches the value of the target sound field, characterized by its target sound pressure.

According to one embodiment, the method comprises a prior determination of distances between at least one point of the second sub-area and the respective positions of the loudspeakers, in order to deduce therefrom the respective acoustic transfer functions of the loudspeakers at said point, said point thus corresponding to a virtual microphone position, the estimation of the sound pressure in the second sub-area then being carried out by taking into account an initial weight applied to each loudspeaker and the transfer function specific to each loudspeaker at the virtual microphone in the second sub-area, and further comprising a determination of distances between at least one point of the first sub-area and the respective positions of the loudspeakers, in order to deduce therefrom the respective acoustic transfer functions of the loudspeakers at said point of the first sub-area, said point thus corresponding to a position of a second virtual microphone.

According to one variant, the point of the second sub-area may correspond to an actual microphone.

The creation of a virtual microphone in each of the sub-areas makes it possible to estimate the transfer functions of each loudspeaker/virtual microphone pair, so that the sound pressure is estimated with precision.

According to one embodiment, a plurality of points is provided at least in the second sub-area, forming the respective positions of a plurality of virtual microphones, in order to estimate a plurality of respective sound pressures in the second sub-area by taking into account the respective weight applied to each loudspeaker and the transfer functions specific to each loudspeaker at each virtual microphone.

In this manner, the sound pressure is estimated at a plurality of points in the second sub-area. This makes it possible to apply weights to each loudspeaker, taking into account the differences in sound pressure that may occur at different points in the second sub-area. The estimation of the sound pressure is therefore carried out in a homogeneous and precise manner over the entire area. The precision of the method is then considerably increased.

According to one embodiment, the target pressure in the second sub-area is evaluated as a function of a desired sound contrast between the first sub-area and the second sub-area, and comprises an estimation of:

the sound pressure in the first sub-area, taking into account the respective weight applied to each loudspeaker and the transfer function specific to each loudspeaker at the at least one second virtual microphone, and from this, the sound contrast as a function of the estimated sound pressure in the first sub-area and the estimated sound pressure in the second sub-area.

Thus, the target sound pressure in the second sub-area is determined by taking into account, at each iteration, the sound pressure in each of the sub-areas. The desired level of contrast is then controlled at each iteration, which has the advantage of taking into account possible perceptual frequency masking effects of the auditory system. Then the goal is no longer solely to maximize the sound contrast between the two sub-areas, but to control the desired sound contrast according to the sound pressures actually estimated in each sub-area.

According to one embodiment, at each iteration, an attenuation coefficient defined by the difference between the desired sound contrast and the estimated sound contrast between the first sub-area and the second sub-area, is applied to the sound pressure in the second sub-area,
the target pressure in the second sub-area then taking the value of the attenuated sound pressure of the second sub-area.

Thus, the method does not seek to produce zero sound pressure in the second sub-area, but on the contrary to specify the target sound field, characterized by its sound pressure, in the second sub-area. The effectiveness of the method is increased. In addition, in the case of a plurality of virtual microphones, the attenuation coefficient is defined at each point corresponding to the virtual microphones. The method then makes it possible to obtain a homogeneous sound contrast between the two sub-areas, at all points of the two sub-areas.

According to one embodiment, the method comprises beforehand, for each listener:
 obtaining geolocation data for a listener in the area, by means of a position sensor,
 defining the first sub-area as corresponding to said geolocation data, as well as the position of said at least one second virtual microphone in said first sub-area,
 defining the second sub-area as being complementary to the first sub-area, as well as the position of said at least one first virtual microphone in said second sub-area.

The method therefore makes it possible to customize the arrangement of the two sub-areas according to the position of a listener.

According to one embodiment, the method further comprises, for each listener,
 repeatedly obtaining geolocation data for the listener in the area by means of a position sensor, and in the event of a change in the geolocation data:
  dynamically defining the first sub-area as corresponding to said geolocation data, as well as the position of said at least one second virtual microphone in said first sub-area,
  dynamically defining the second sub-area as being complementary to the first sub-area, as well as the position of said at least one first virtual microphone in said second sub-area,
the distances between said at least one first virtual microphone and the respective positions of the loudspeakers being calculated dynamically in order to deduce therefrom the respective acoustic transfer functions of the loudspeakers at said at least one first virtual microphone, and
the estimation of the sound pressure in the second sub-area then being carried out by taking into account the respective weight applied to each loudspeaker,
 each respective weight applied to a loudspeaker comprising a first term corresponding to a respective weight calculated in a previous iteration and a second term that is a function of the error, a forgetting factor attenuating the term corresponding to the weight calculated in the previous iteration then being applied to each respective weight.

It is thus possible to define the two sub-areas dynamically, according to the position of a listener. More specifically, the first sub-area, in which the sound field is audible, perpetually follows the listener. The application of a weight including a forgetting factor makes it possible to avoid restarting the method each time the listener moves, which greatly increases its efficiency.

According to one embodiment, the method further comprises, iteratively and continuously:
 estimating the sound pressure in the first sub-area, as a function of said respective control signals of the loudspeakers at the at least one second virtual microphone and of the respective weight of the control signals of the loudspeakers,
 calculating a degradation between the estimated sound pressure in the first sub-area and a target sound pressure desired in the first sub-area, said target sound pressure being defined beforehand,
 and, applying respective weights to the control signals of the loudspeakers on the basis of said degradation, so that the sound pressure in the first sub-area reaches the target pressure,
 the sound pressure in the first sub-area and in the second sub-area respectively being calculated one again, as a function of the respective weighted control signals of the loudspeakers.

The sound field in the first sub-area is also continuously controlled. In this manner, the target sound field, characterized by the target sound pressure in the sub-area, can be continuously achieved in the first sub-area. Sound degradations are compensated for at each iteration.

According to one embodiment, the number of iterations of the method, so that the sound pressure of the first sub-area reaches the target sound pressure desired in the first sub-area, is comprised between 10 and 1000, preferably between 200 and 800, and more preferably between 400 and 500.

"Reaching the target sound pressure" is understood to mean that the error between the sound pressure of the first sub-area and the target sound pressure desired in the first sub-area is negligible. In particular, the error can be defined based on psychoacoustic data from users. These psychoacoustic data may be obtained by measurements aimed at determining a perception threshold for users. In particular, the perception threshold can change according to the sound signals constituting the sound scene or according to the frequency of the sound signals.

The method appears to be very efficient, given the small number of iterations before the method converges.

According to one embodiment, the chosen sound field is a first sound field, a second chosen sound field also being produced which is selectively audible in the second sub-area, and wherein the aim is to render the second sound field inaudible in the first sub-area, the loudspeakers being supplied with respective first control signals so that each one emits a continuous audio signal corresponding to the first chosen sound field, and with respective second control signals so that each one emits a continuous audio signal corresponding to the second chosen sound field,
the steps of the method according to the invention being applied to the first sub-area so as to render the second sound field inaudible in the first sub-area.

Thus, the method can also be implemented in the case where two sound fields are produced in the same area. The method can also be implemented for more than two sound fields.

According to one embodiment, each sub-area comprises at least one virtual microphone and two loudspeakers, and preferably each sub-area comprises at least ten virtual microphones and at least ten loudspeakers.

The invention also relates to a spatialized sound reproduction system based on an array of loudspeakers, with a view to generating a chosen sound field which is selectively audible in a first predetermined sub-area of an area covered by the loudspeakers, said area further comprising a second sub-area in which the aim is to render said chosen sound field inaudible, comprising a processing unit suitable for the processing and implementing of the method according to the invention.

BRIEF DESCRIPTION OF THE DRAWINGS

Other features and advantages of the invention will be apparent from reading the following detailed description of some exemplary embodiments of the invention, and from examining the accompanying drawings in which.

DETAILED DESCRIPTION OF ILLUSTRATIVE EMBODIMENTS

The embodiments described with reference to the figures may be combined.

Figure 1:
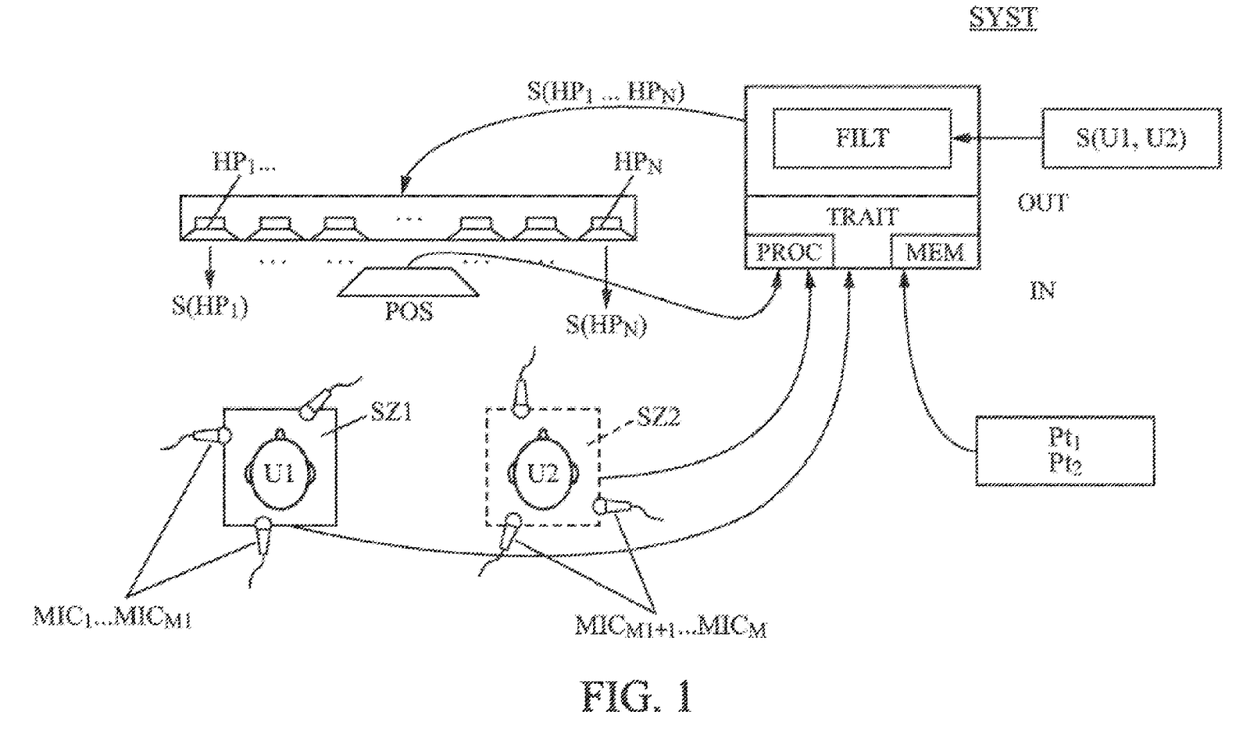
FIG. 1 represents an example of a system according to one embodiment of the invention.

FIG. 1 schematically illustrates a system SYST according to one exemplary embodiment. The system SYST comprises an array of loudspeakers HP comprising N loudspeakers ($HP_1, \ldots, HP_N$), with N at least equal to 2, and preferably at least equal to 10. The array of loudspeakers HP covers an area comprising a first sub-area SZ1 and a second sub-area SZ2. The loudspeakers HP are supplied with respective control signals so that each one emits a continuous audio signal, with a view to spatialized sound generation of a chosen sound field. The chosen sound field is to be rendered audible in one of the sub-areas and inaudible in the other sub-area. For example, the chosen sound field is audible in the first sub-area SZ1. The chosen sound field is to be rendered inaudible in the second sub-area SZ2. The loudspeakers may be defined by their position in the area.

According to one exemplary embodiment, each sub-area SZ may be defined by the geolocation data of a listener. In particular, the geolocation data of a listener U are obtained by means of a position sensor POS. Based on the geolocation data of the listener, it is then possible to define the first sub-area SZ1 within which listener U1 hears the chosen sound field. Sub-area SZ1 has for example predefined dimensions. In particular, the first sub-area may correspond to a perimeter of a few tens of centimeters to a few tens of meters, listener U1 being at the center. The second sub-area SZ2, in which the chosen sound field is to be rendered inaudible, may be defined as the sub-area complementary to the first sub-area SZ1. Listener U2, present in the second sub-area SZ2, therefore does not hear the chosen sound field.

According to an alternative embodiment, the definition of the sub-areas is not based on the position of the listeners U but is predefined and constant. This may be the case in particular in museums, where a different sound field is produced in association with each painting. A listener then hears only the sound field associated with the painting he or she is facing. The perimeter around the painting then represents the first sub-area, while the rest of the museum represents the second sub-area.

The area is additionally covered by microphones MIC. More precisely, each sub-area SZ comprises at least one microphone MIC. In one exemplary embodiment, the area is covered by an array of M microphones MIC, with M at least equal to 2 and preferably at least equal to 10. For example, the first sub-area SZ1 is covered by microphones $MIC_1$ to $MIC_{M1}$ and the second sub-area SZ2 is covered by microphones $MIC_{M1+1}$ to $MIC_M$. In one particular embodiment, the microphones MIC are virtual microphones. In the remainder of the description the term "microphone MIC" is used, the microphones being real or virtual. The microphones MIC are identified by their position in each of the sub-areas SZ1, SZ2.

In one exemplary embodiment in which the system comprises virtual microphones, points are defined in each of the sub-areas. The points are identified by their respective positions. A virtual microphone MIC is associated with each of the points, such that the position of each virtual microphone is that of the point with which it is associated.

In one exemplary embodiment, the points are defined only once, the position of the virtual microphones MIC being constant. According to another embodiment, the points may perpetually be redefined, so that the position of the virtual microphones changes. The same is true in the case where real microphones are used.

The system SYST further comprises a processing unit TRAIT able to implement the steps of the method. The processing unit TRAIT comprises in particular a memory, forming a storage medium for a computer program comprising code portions for implementing the method described below with reference to FIGS. 2 and 3. The processing unit TRAIT further comprises a processor PROC capable of executing the code portions of the computer program.

The processing unit TRAIT receives as input the position of the microphones MIC, the geolocation data of the listeners U, the positions of each loudspeaker HP, the audio signals to be reproduced $S(U_1 \ldots U_S)$ intended respectively for users $U_1$ to $U_S$, and the target sound field $Pt_1$, $Pt_2$ to be achieved in each sub-area. From these data, the processing unit TRAIT calculates the filter FILT to be applied to the signals $S(U_1 \ldots U_S)$ in order to construct the target sound fields $Pt_1$, $Pt_2$ in the sub-areas. The processing unit TRAIT outputs the filtered signals $S(HP_1 \ldots HP_N)$ to be respectively produced from the loudspeakers $HP_1$ to $HP_N$.

The system SYST has many applications. For example, the system SYST may be intended for museums. For example, loudspeakers HP are placed in the museum and produce sound signals corresponding in particular to commentary or explanations of works of art. A first sub-area may be defined in front of each work of art, the rest of the museum forming the second sub-area in which the commentaries corresponding to that work of art are to be rendered inaudible. In this application, the processing unit TRAIT may be integrated into a server of the museum.

Another application may be for viewing multimedia content, for example for individuals viewing a film. Thus, the processing unit TRAIT may be installed in a set-top box. A first sub-area in which the sound signals of the film are audible may be a perimeter around the television, and the second sub-area in which the sound signals are to be rendered inaudible may be the rest of the home.

Alternatively, in the case where several listeners are present and wish to hear different sound signals, for example in different languages, several sub-areas may be formed based on the positions of each of the users. Thus, a first sub-area is formed around each user, the rest of the house forming the second sub-area. Each user thus hears the sound signals in the chosen language while these sound signals are not audible in the rest of the home.

Figure 2A:
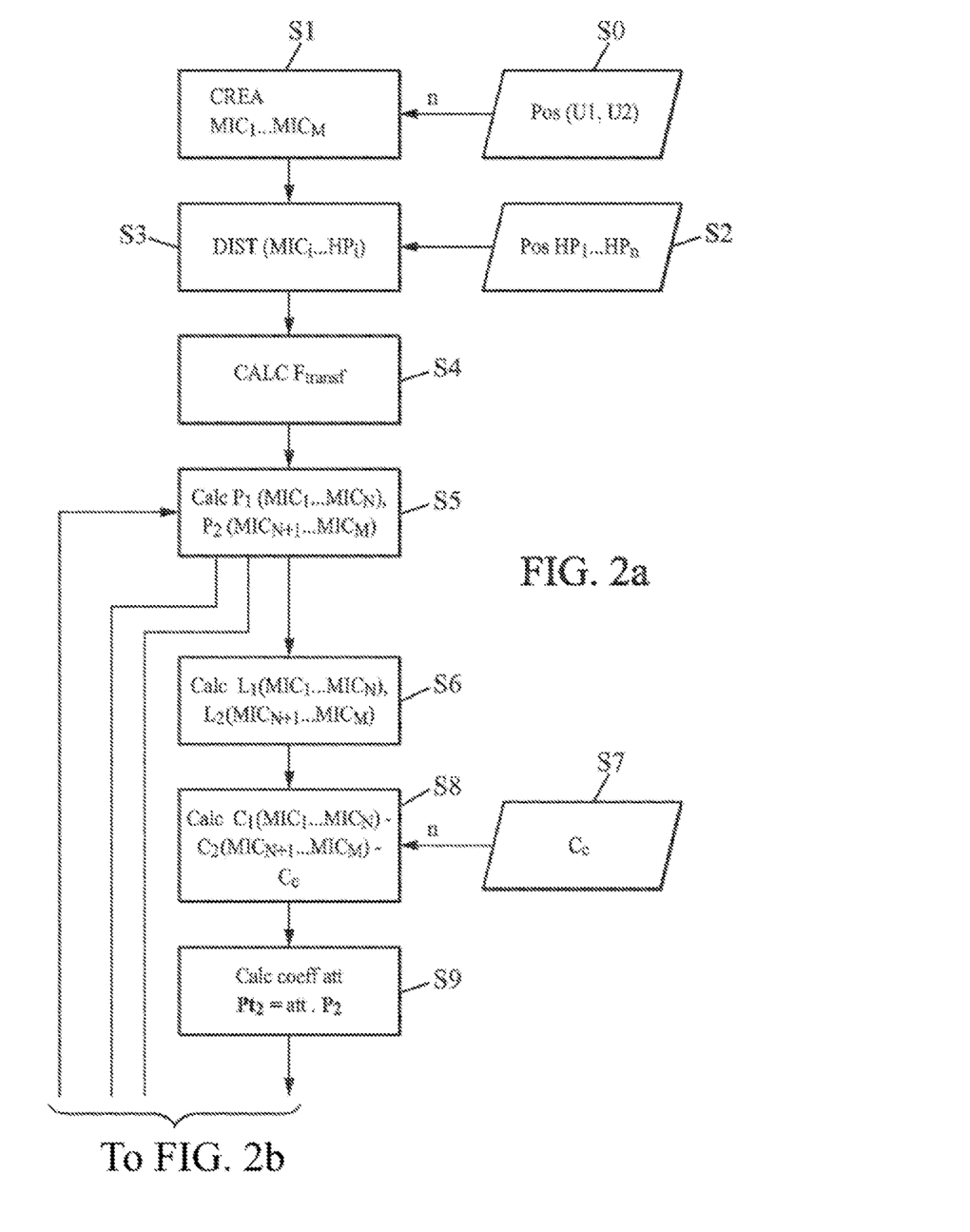
FIGS. 2a and 2b show a flowchart illustrating the main steps of one particular embodiment of the method, FIG. 3 schematically illustrates an embodiment in which the two sub-areas are defined dynamically according to the geolocation data of a listener.
Figure 2B:
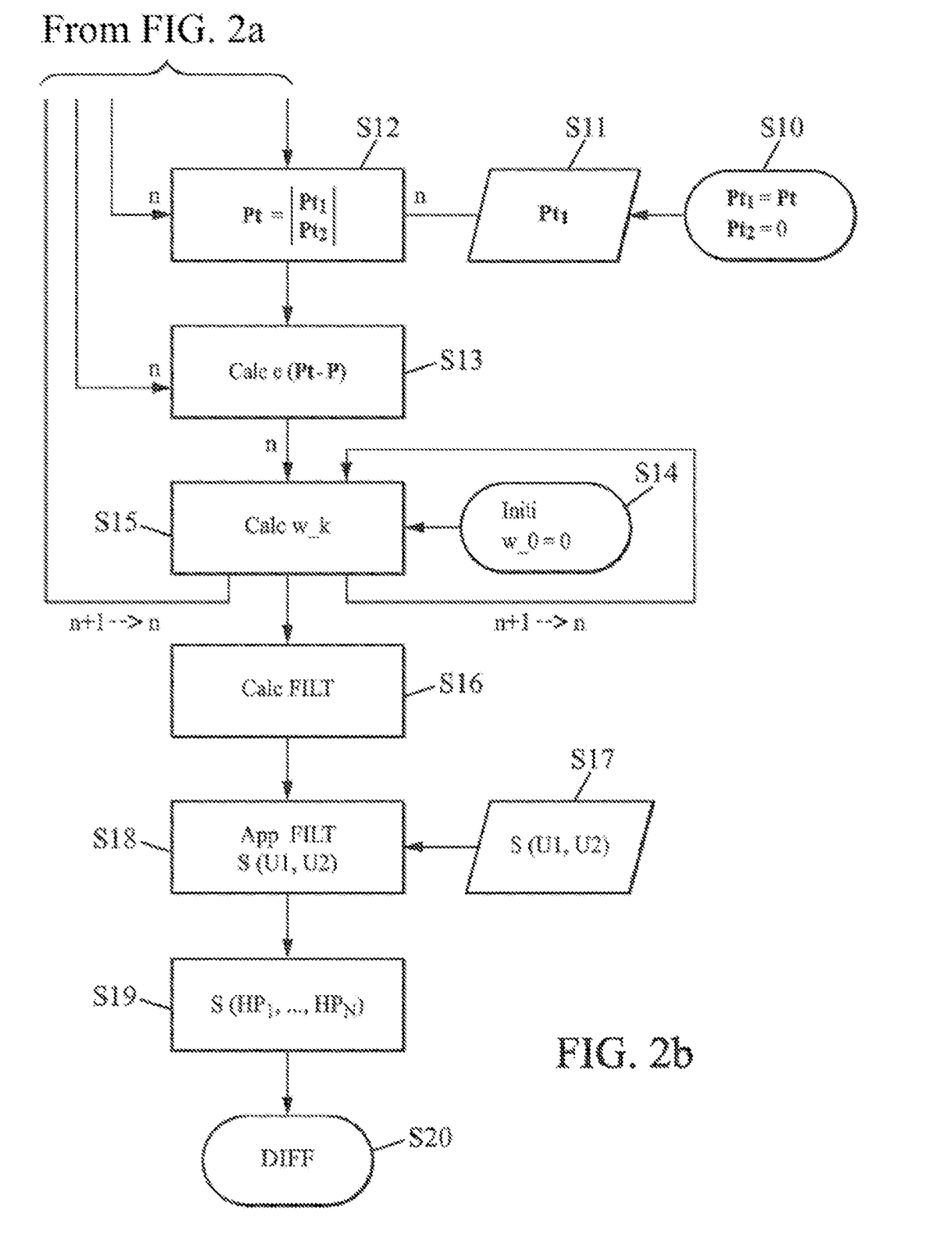

FIGS. 2a and 2b illustrate the main steps of the method according to the invention. The steps of the method are implemented by the processing unit TRAIT, continuously and in real time.

The method as described with reference to FIGS. 2a and 2b aims to render the chosen sound field inaudible in one of the sub-areas, for example in the second sub-area SZ2. The method is based on an estimate of sound pressures in each of the sub-areas, in order to apply a desired level of sound contrast between the two sub-areas. At each iteration, the audio signals S(U1, U2) are filtered according to the estimated sound pressures and the level of sound contrast in order to obtain the control signals S(HP$_1$ ... HP$_N$) to be produced on the loudspeakers.

According to the non-limiting exemplary embodiment illustrated in FIGS. 2a, 2b, the sub-areas SZ1, SZ2 are defined by the position of at least one listener U1, U2.

In step S0, the geolocation data of at least one of the two listeners U1, U2 are determined, for example by means of a position sensor POS. From these geolocation data, the two sub-areas SZ1, SZ2 are defined. For example, the first sub-area corresponds to the geolocation data of the first listener U1. The first sub-area SZ1 is for example defined as being an area of a few tens of centimeters to a few tens of meters in circumference, the first listener U1 being the center. The second sub-area SZ2 may be defined as being complementary to the first sub-area SZ1.

In step S1, the array of microphones MIC is defined. For example, in the case of virtual microphones, at least one point and preferably a plurality of points each associated with a position in one of the sub-areas SZ1, SZ2 is defined. In particular, each sub-area SZ1, SZ2 comprises at least one point. Preferably, each sub-area SZ1, SZ2 comprises about ten points. The positions of the points in the sub-areas SZ1, SZ2 define the positions of the virtual microphones MIC in each sub-area.

In step S2, the position of each loudspeaker is determined. In particular, the area comprises an array of loudspeakers comprising at least two loudspeakers HP. Preferably, the array of loudspeakers comprises about ten loudspeakers HP. The loudspeakers HP may be distributed in the area so that the entire area is covered by the loudspeakers.

In step S3, a distance between each loudspeaker HP/microphone MIC pair is calculated. This enables the ability to calculate each of the transfer functions Ftransf for each loudspeaker HP/microphone MIC pair, in step S4.

In other words, the target sound field can be defined as a vector $$Pt(\omega, n) = \begin{bmatrix} Pt_1 \\ Pt_2 \end{bmatrix},$$

for the sets of microphones MIC, at each instant n for a pulse $\omega=2\pi f$, f being the frequency. The microphones MIC$_1$ to MIC$_M$ are arranged at positions $x_{MIC}$=[MIC$_1$, ..., MIC$_M$] and capture a set of sound pressures grouped in vector P($\omega$, n).

The sound field is reproduced by the loudspeakers (HP$_1$, ..., HP$_N$) which are fixed and have as their respective position $x_{HP}$=[HP$_1$, ..., HP$_N$]. The loudspeakers (HP$_1$, ..., HP$_N$) are controlled by a set of weights grouped in vector q($\omega$, n)=[q$_1$($\omega$, n), ..., q$_N$($\omega$, n)]$^T$. The exponent $^T$ is the transposition operator.

The sound field propagation path between each loudspeaker HP/microphone MIC pair can be defined by a set of transfer functions G($\omega$, n) grouped in the matrix:

$$G(\omega, n) = \begin{bmatrix} G_{11}(\omega, n) & \cdots & G_{1N}(\omega, n) \\ \vdots & \ddots & \vdots \\ G_{M1}(\omega, n) & \cdots & G_{MN}(\omega, n) \end{bmatrix}$$

with the defined transfer functions being:

$$G_{ml} = \frac{j\rho c k}{4\pi R_{ml}} e^{-jkR_{ml}},$$

where R$_{m1}$ is the distance between a loudspeaker/microphone pair, k is the wave number, $\rho$ the density of the air, and c the speed of sound.

In step S5, the sound pressures P$_1$ and P$_2$ are respectively determined in the first sub-area SZ1 and in the second sub-area SZ2.

According to one exemplary embodiment, the sound pressure P$_1$ in the first sub-area SZ1 can be the sound pressure resulting from the signals produced by the loudspeakers in the first sub-area. The sound pressure P$_2$ in the second sub-area, in which the sound signals are to be rendered inaudible, may correspond to the induced sound pressure resulting from the signals produced by the loudspeakers supplied with the control signals associated with the pressure P$_1$ induced in the first sub-area.

The sound pressures P$_1$, P$_2$ are determined from the transfer functions Ftransf calculated in step S4, and from an initial weight applied to the control signals of each loudspeaker. The initial weight applied to the control signals of each of the loudspeakers is zero. The weight applied to the control signals then tends to vary with each iteration, as described below.

According to this exemplary embodiment, the sound pressures P$_1$, P$_2$ each include the set of sound pressures determined at each of the positions of the virtual microphones. The estimated sound pressure in the sub-areas is thus more representative. This makes it possible to obtain a homogeneous result as output from the method.

Alternatively, a sound pressure determined at a single position P$_1$, P$_2$ is respectively estimated for the first sub-area SZ1 and for the second sub-area SZ2. This makes it possible to limit the number of calculations, and therefore to reduce the processing time and consequently the responsiveness of the system.

More specifically, the sound pressures P$_1$, P$_2$ in each of the sub-areas can be grouped in the form of a vector defined as:

$$p(\omega, n) = \begin{bmatrix} P_1 \\ P_2 \end{bmatrix} = G(\omega, n) q(\omega, n)$$

In step S6, the sound levels $L_1$ and $L_2$ are determined respectively in the first sub-area SZ1 and in the second sub-area SZ2. The sound levels $L_1$ and $L_2$ are determined at each position of the microphones MIC. This step makes it possible to convert the values of the estimated sound pressures $P_1$, $P_2$ into values measurable in decibels. In this manner, the sound contrast between the first and the second sub-area can be calculated. In step S7, a desired sound contrast level Cc between the first sub-area and the second sub-area is defined. For example, the desired sound contrast Cc between the first sub-area SZ1 and the second sub-area SZ2 is defined beforehand by a designer based on the chosen sound field and/or the sound perception of the listeners U1, U2 in each sub-area.

More specifically, the sound level L for a microphone can be defined by $$L = 20\log_{10}\left(\frac{|P|}{p_0}\right),$$

where $p_0$ is the reference sound pressure, meaning the perception threshold.

Thus, the average sound level in a sub-area can be defined as:

$$L = 10\log_{10}\left(\frac{P^H P / M}{p_0^2}\right),$$

where $P^H$ is the conjugate transpose of the sound pressure vector in the sub-area and M is the number of microphones in that sub-area.

From the sound level $L_1$, $L_2$ in the two sub-areas, it is possible to calculate the estimated sound contrast C between the two sub-areas: $C = L_1 - L_2$.

In step S8, the difference between the estimated sound contrast between the two sub-areas and the desired sound contrast $C_C$ is calculated. From this difference, an attenuation coefficient can be calculated. The attenuation coefficient is calculated and applied to the estimated sound pressure $P_2$ in the second sub-area, in step S9. More precisely, an attenuation coefficient is calculated and applied to each of the estimated sound pressures $P_2$ at each of the positions of the microphones MIC of the second sub-area SZ2. The target sound pressure $Pt_2$ in the second sub-area then takes the value of the attenuated sound pressure $P_2$ of the second sub-area.

Mathematically, the difference $C_\xi$ between the estimated sound contrast C and the desired sound contrast $C_C$ can be calculated as follows: $C_\xi = C - C_C = L_1 - L_2 - C_C$. We can then calculate the attenuation coefficient $$\xi = 10^{\frac{c_\xi}{20}}.$$

This coefficient is determined by the amplitude of the sound pressure to be given to each microphone so that the sound level in the second sub-area is homogeneous. When the contrast is equivalent to that corresponding to the desired sound contrast $C_C$ for a microphone in the second sub-area, then $C_\xi \approx 0$ therefore $\xi \approx 1$. This means that the estimated sound pressure at this microphone corresponds to the target pressure value in the second sub-area.

When the difference between the estimated sound contrast C and the desired sound contrast $C_C$ is negative $C_\xi < 0$, this means that the desired contrast $C_C$ has not yet been reached, and therefore that a lower pressure amplitude than the current one must be obtained at this microphone.

When the difference between the estimated sound contrast C and the desired sound contrast $C_C$ is positive $C_\xi > 0$, the sound pressure at this point is too low. It must therefore be increased to match the desired sound contrast in the second sub-area.

The principle is therefore to use the pressure field present in the second sub-area which is induced by the sound pressure in the first sub-area, then to attenuate or amplify the individual values of estimated sound pressures at each microphone, so that they match the target sound field in the second sub-area on all microphones. For all microphones, we define the vector: $\xi = [\xi_1, \ldots, \xi_m, \ldots, \xi_M]^T$.

This coefficient is calculated at each iteration and can therefore change. It can therefore be written in the form $\xi(n)$.

Alternatively, in the case where a single sound pressure $P_2$ is estimated for the second sub-area SZ2, a single attenuation coefficient is calculated and applied to sound pressure $P_2$.

The attenuation coefficients are calculated so as to meet the contrast criterion defined by the designer. In other words, the attenuation coefficient is defined so that the difference between the sound contrast between the two sub-areas SZ2 and the desired sound contrast $C_C$ is close to zero.

Steps S10 to S12 allow defining the value of the target sound pressures $Pt_1$, $Pt_2$ in the first and second sub-area SZ1, SZ2.

Step S10 comprises initializing the target sound pressures $Pt_1$, $Pt_2$ respectively in the first and second sub-area SZ1, SZ2. The target sound pressures $Pt_1$, $Pt_2$ characterize the target sound field to be produced in the sub-areas. The target sound pressure $Pt_1$ in the first sub-area SZ1 is defined as being a target pressure $Pt_1$ chosen by the designer. More precisely, the target pressure $Pt_1$ in the first sub-area SZ1 is greater than zero, so the target sound field is audible in this first sub-area. The target sound pressure $Pt_2$ in the second sub-area is initialized to zero. The target pressures $Pt_1$, $Pt_2$ are then transmitted to the processing unit TRAIT in step S11, in the form of a vector Pt.

At each iteration, new target pressure values are assigned to the target pressures $Pt_1$, $Pt_2$ determined in the previous iteration. This corresponds to step S12. More precisely, the value of target pressure $Pt_1$ in the first sub-area is the value defined in step S10 by the designer. The designer can change this value at any time. The target sound pressure $Pt_2$ in the second sub-area takes the value of the attenuated sound pressure $P_2$ (step S9). This allows, at each iteration, redefining the target sound field to be rendered in the second sub-area, taking into account the listener's perception and the loudspeakers' control signals. The target sound pressure $Pt_2$ of the second sub-area is thus only equal to zero during the first iteration. Indeed, as soon as the loudspeakers produce a signal, a sound field is perceived in the first sub-area but also in the second sub-area.

Mathematically, the target pressure $Pt_2$ in the second sub-area is calculated as follows.

In the first iteration, $Pt_2$ is equal to zero: $Pt_2(0) = 0$.

In each iteration, the estimated sound pressure $P_2$ in the second sub-area is calculated. This sound pressure corresponds to the sound pressure induced in the second sub-area by radiation from the loudspeakers in the first sub-area. Thus, in each iteration we have: $P_2(\omega, n) = G_2(\omega, n) q(\omega, n)$, where $G_2(\omega, n)$ is the matrix of transfer functions in the second sub-area at iteration n.

The target pressure $Pt_2$ at iteration n+1 can therefore be calculated as $Pt_2(n+1)=\xi(n) \times P_2$.

In step S13, the error between the target pressure $Pt_2$ and the estimated pressure $P_2$ in the second sub-area is calculated. The error is due to the fact that an adaptation increment $\mu$ is applied so that the target pressure $Pt_2$ is not immediately reached. The target pressure $Pt_2$ is reached after a certain number of iterations of the method. This makes it possible to minimize the computing resources necessary to reach the target pressure $Pt_2$ in the second sub-area SZ2. This also allows ensuring the stability of the algorithm. In the same manner, the adaptation increment $\mu$ is also chosen so that the error calculated in step S13 has a small value, in order to stabilize the filter.

The error calculated in step S13 is used to calculate weights to be applied to the loudspeakers' control signals. More precisely, in the first iteration the weights are initialized to zero (step S14). Each loudspeaker produces an unweighted control signal. Then, at each iteration, the value of the weights varies according to the error (step S15). Each respective weight applied to a loudspeaker thus comprises a first term corresponding to a respective weight calculated in a previous iteration and a second term that is a function of the error. The loudspeakers then produce a weighted control signal, which may be different in each new iteration. This modification of the control signals explains in particular that the sound pressures $Pt_1$, $Pt_2$ estimated in the sub-areas SZ1, SZ2 can be different at each iteration.

Mathematically, the weights q can be calculated as follows.

$q(n+1)=q(n)(1-\mu\gamma(n))+\mu G^H(n)(G(n)q(n)-Pt(n))$, where $\mu$ is the adaptation increment which can vary with each iteration and $\gamma(n)$ corresponds, in one exemplary embodiment, to a forgetting factor which may vary over time and possibly may be defined arbitrarily. In order to guarantee stability of the filter, it is advantageous to avoid the adaptation increment $\mu$ being greater than the inverse of the greatest eigenvalue of $G^H G$.

The filters FILT to be applied to the loudspeakers are then determined in step S16. One filter per loudspeaker is calculated for example. There can therefore be as many filters as there are loudspeakers. The type of filters applied to each loudspeaker comprises for example an inverse Fourier transform.

The filters are then applied to the audio signals to be reproduced $S(U_1, U_2)$, which have been obtained in step S17. Step S17 is an initialization step, implemented only during the first iteration of the method. The audio signals to be reproduced $S(U_1, U_2)$ are respectively intended for each of the listeners $U_1, U_2$ according to the sub-area in which they are located. In step S18, the filters FILT are applied to the signals $S(U_1, U_2)$ in order to obtain N filtered control signals $S(HP_1, \ldots, HP_N)$ to be respectively produced by the loudspeakers $HP_1, HP_N$ in step S19. The control signals $S(HP_1, \ldots, HP_N)$ are respectively produced by each loudspeaker $(HP_1, \ldots, HP_N)$ of the array of loudspeakers in step S20. Typically, the loudspeakers HP produce the control signals continuously.

Then, in each iteration, the filters FILT are calculated as a function of the signals $S(HP_1, \ldots, HP_N)$ filtered in the previous iteration and produced by the loudspeakers, as perceived by the microphone array. Filters FILT are applied to the signals $S(U_1, U_2)$ in order to obtain new control signals $S(HP_1, \ldots, HP_N)$ to be respectively produced on each loudspeaker of the array of loudspeakers.

The method is then restarted beginning with step S5, in which the sound pressures $P_1$, $P_2$ of the two sub-areas SZ1, SZ2 are estimated.

Due to the steps described above, the number of iterations required for the method to converge, in other words for the estimated sound pressure $P_2$ in the second sub-area SZ2 to be substantially equal to the target sound pressure $Pt_2$ in the second sub-area, is between 10 and 1000, preferably between 200 and 800, and even more preferably between 400 and 500. In other words, this corresponds to the number of iterations required for the error to be equal to zero or substantially equal to zero. "Substantially equal" is understood to mean that a small margin of error may exist. The margin of error still allows the chosen sound field in the second sub-area to be rendered inaudible. When the error is equal to or substantially equal to zero, the weights calculated and applied to the loudspeakers' control signals are the same as those calculated and applied in the previous iteration.

The number of iterations is thus relatively low, which allows a fast convergence time. Also, the implementation of an iterative process makes it possible to reduce the necessary computing resources.

Of course, other embodiments according to the invention are possible. In particular, with reference to FIGS. 2a, 2b, the two sub-areas SZ1, SZ2 have been described as only being defined once. More precisely, the geolocation data of a listener make it possible to define the first sub-area SZ1, in which the chosen sound field is audible, and thereby to define the array of microphones MIC of the first sub-area. The second sub-area SZ2 is then defined as being complementary to the first sub-area SZ1, regardless of the geolocation data of the other listeners U.

Figure 3:
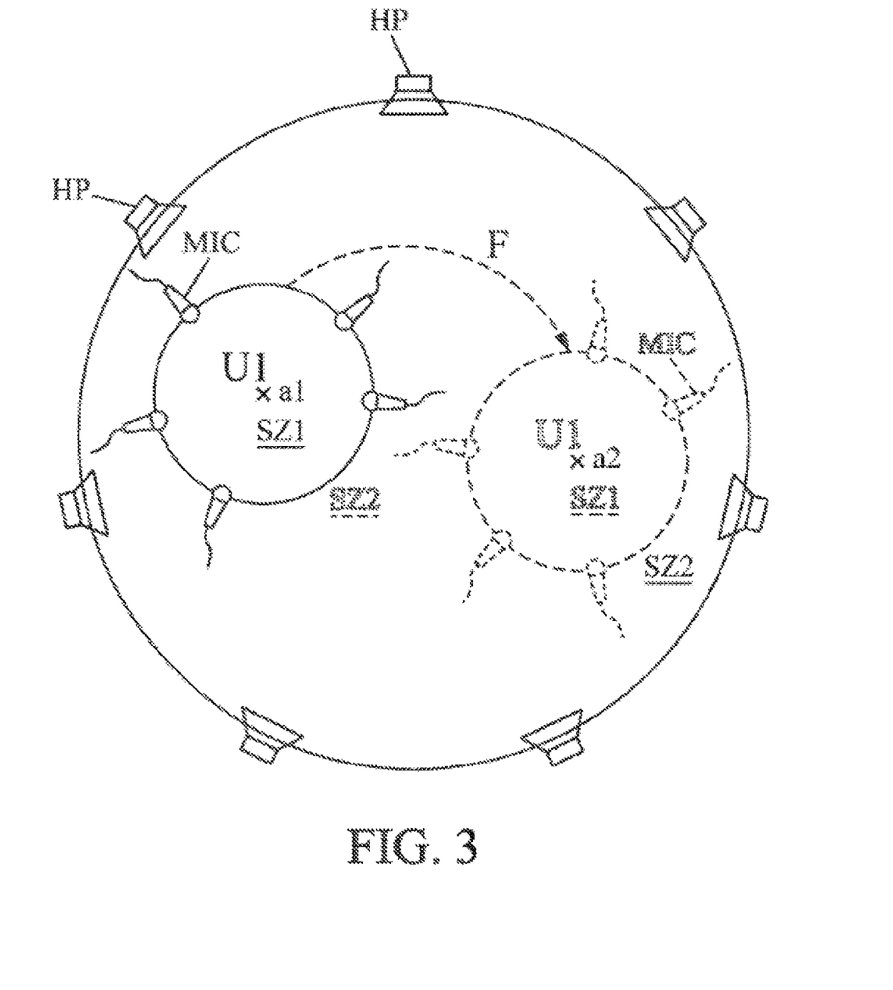

In an alternative embodiment illustrated in FIG. 3, the geolocation data of the listener $U_1$ located in the first sub-area SZ1 are obtained repeatedly, so that the first sub-area SZ1, as well as the array of microphones of the first sub-area SZ1, are dynamically defined with each movement of the listener in the first sub-area SZ1. Similarly, the second sub-area SZ2 is dynamically redefined as being complementary to the first sub-area SZ1, regardless of the geolocation data of the other listeners U.

In FIG. 3, the first sub-area SZ1 is defined by the position a1 of the listener U1 (represented with solid lines). The array of microphones MIC is defined so that it covers the first sub-area SZ1. The second sub-area SZ2 is complementary to the first sub-area SZ1. The arrow F illustrates a movement of the listener U1 to a position a2. The first sub-area SZ1 is then redefined around the listener U1 (with dotted lines). The array of microphones MIC is redefined to cover the new first sub-area SZ1. The remainder of the area represents the new second sub-area SZ2. The first sub-area SZ1 initially defined by position a1 of the listener is thus now located in the second sub-area SZ2.

According to this embodiment, in each iteration the method is restarted from step S1. However, the desired target pressure $Pt_2$ in the second sub-area is estimated based on the weights applied to the control signals during the previous iterations. The method therefore comprises a memory of the weights calculated in the preceding iterations, which can be problematic when the sub-areas are dynamically redefined. An additional step may then be provided. This step comprises the determination of a forgetting factor, to be applied to the weights in step S15. This forgetting factor makes it possible to reduce the term corresponding to the weight calculated in the previous iteration. In this manner, the method can operate continuously, while limiting the error due to dynamic redefinition of the sub-areas. Also, the forgetting factor allows the system to be adjusted, to avoid divergence of the system.

As described with reference to step S15 in FIG. 2, the weights are calculated as follows:

$$q(n+1)=q(n)(1-\mu\gamma(n))+\mu G^H(n)(G(n)q(n)-Pt(n)),$$
where $\gamma$ is the forgetting factor.

According to another embodiment, the method comprises a step of calculating a degradation between the sound pressure $P_1$ estimated in the first sub-area SZ1 and the target sound pressure $Pt_1$ desired in the first sub-area SZ1. The calculation of the weights in step S15 takes into account the result of the degradation calculation, so that the pressure $P_1$ in the first sub-area SZ1 remains equal to the desired target pressure $Pt_1$. The target pressure $Pt_1$ may remain constant throughout the implementation of the method. Alternatively, the target sound pressure $Pt_1$ may be changed by the designer at any time in step S11. The method is then restarted from the step S5 of estimating the sound pressures $Pt_1$, $Pt_2$ in the sub-areas on the basis of the weighted control signals.

According to another variant embodiment, the chosen sound field is a first sound field, at least one second chosen sound field being produced by the array of loudspeakers HP. The second chosen sound field is audible in the second sub-area and is to be rendered inaudible in the first sub-area. The loudspeakers are supplied with the first control signals so that each one emits a continuous audio signal corresponding to the first chosen sound field, and are also supplied with second control signals so that each one emits a continuous audio signal corresponding to the second chosen sound field. The steps of the method as described above can be applied to the first sub-area SZ1, so that the second chosen sound field is rendered inaudible in the first sub-area SZ1.

In this exemplary embodiment, the first and second sub-areas SZ1, SZ2 may be defined independently for each listener U present in the area. For example, a first sub-area SZ1 is defined according to the position of a first listener U1, the second sub-area SZ2 being defined as being complementary to the first sub-area SZ1, regardless of the geolocation data of every other listener U present in the area. The definition of the sub-areas is done in the same manner for each of the listeners U present in the area. Thus, by considering the point of view of one listener U at a time, the area only comprises two sub-areas SZ1, SZ2. More generally, the area can be broken down into as many sub-areas, a different sound field being audible in each one, each sub-area being defined by the position of a listener in the area. The method is then implemented in parallel for each of the sub-areas, so that the chosen sound field produced in one sub-area is not audible in the rest of the area.

According to another exemplary embodiment, the first and second sub-areas are not complementary. For example, in an area, a first sub-area may be defined relative to a first listener U1 and a second sub-area may be defined relative to a second listener U2. The sound field is to be rendered audible in the first sub-area and inaudible in the second sub-area. The sound field in the rest of the area is possibly not controlled.

Although the present disclosure has been described with reference to one or more examples, workers skilled in the art will recognize that changes may be made in form and detail without departing from the scope of the disclosure and/or the appended claims.

The invention claimed is:

1. A method for spatialized sound reproduction using an array of loudspeakers, with a view to generating a chosen sound field which is selectively audible in a first predetermined sub-area of an area covered by the loudspeakers, said area further comprising a second sub-area in which chosen sound field is rendered inaudible, wherein, the loudspeakers being supplied with respective control signals so that each loudspeaker continuously emits an audio signal, the method comprising a processing unit performing iteratively and continuously:
estimating a sound pressure in the second sub-area, at least as a function of the respective control signals of the loudspeakers, and of a respective initial weight of the control signals of the loudspeakers,
calculating an error between the estimated sound pressure and a target sound pressure desired in the second sub-area,
and, calculating and applying respective weights to the control signals of the loudspeakers, on the basis of said error,
the sound pressure in the second sub-area being calculated once again, on the basis of the respective weighted control signals of the loudspeakers, each respective weight applied to a loudspeaker comprising a first term corresponding to a respective weight calculated in a previous iteration and a second term which is a function of the error.

2. The method according to claim 1, comprising a prior determination of distances between at least one point of the second sub-area and the respective positions of the loudspeakers, in order to deduce therefrom the respective acoustic transfer functions of the loudspeakers at said point,
said point thus corresponding to a virtual microphone position,
the estimation of the sound pressure in the second sub-area then being carried out by taking into account an initial weight applied to each loudspeaker and the transfer function specific to each loudspeaker at the virtual microphone in the second sub-area,
and further comprising determining distances between at least one point of the first sub-area and the respective positions of loudspeakers, in order to deduce therefrom the respective acoustic transfer functions of the loudspeakers at said point of the first sub-area,
said point thus corresponding to a position of a second virtual microphone.

3. The method according to claim 2, wherein a plurality of points is provided at least in the second sub-area, forming the respective positions of a plurality of virtual microphones, in order to estimate a plurality of respective sound pressures in the second sub-area by taking into account the respective weight applied to each loudspeaker and the transfer functions specific to each loudspeaker at each virtual microphone.

4. The method according to claim 2, wherein the target pressure in the second sub-area is evaluated as a function of a desired sound contrast between the first sub-area and the second sub-area, and comprises an estimation of:
the sound pressure in the first sub-area, taking into account the respective weight applied to each loudspeaker and the transfer function specific to each loudspeaker at the at least one second virtual microphone,
and from this, the sound contrast as a function of the estimated sound pressure in the first sub-area and the estimated sound pressure in the second sub-area.

5. The method according to claim 4, wherein, at each iteration, an attenuation coefficient defined by the difference between the desired sound contrast and the estimated sound contrast between the first sub-area and the second sub-area, is applied to the sound pressure in the second sub-area, the target pressure in the second sub-area then taking the value of the attenuated sound pressure of the second sub-area.

6. The method according to claim 2, comprising beforehand, for each listener:
obtaining geolocation data for a listener in the area, by a position sensor,
defining the first sub-area as corresponding to said geolocation data, as well as the position of said at least one second virtual microphone in said first sub-area,
defining the second sub-area as being complementary to the first sub-area, as well as the position of said at least one first virtual microphone in said second sub-area.

7. The method according to claim 2, further comprising, for each listener:
repeatedly obtaining geolocation data for the listener in the area by a position sensor, and in the event of a change in the geolocation data:
dynamically defining the first sub-area as corresponding to said geolocation data, as well as the position of said at least one second virtual microphone in said first sub-area,
dynamically defining the second sub-area as being complementary to the first sub-area, as well as the position of said at least one first virtual microphone in said second sub-area,
the distances between said at least one first virtual microphone and the respective positions of the loudspeakers being calculated dynamically in order to deduce therefrom the respective acoustic transfer functions of the loudspeakers at said at least one first virtual microphone, and
the estimation of the sound pressure in the second sub-area then being carried out by taking into account the respective weight applied to each loudspeaker, each respective weight applied to a loudspeaker comprising a first term corresponding to a respective weight calculated in a previous iteration and a second term that is a function of the error, a forgetting factor attenuating the term corresponding to the weight calculated in the previous iteration then being applied to each respective weight.

8. The method according to claim 2, further comprising, iteratively and continuously:
estimating the sound pressure in the first sub-area, as a function of said respective control signals of the loudspeakers at the at least one second virtual microphone and of the respective weight of the control signals of the loudspeakers,
calculating a degradation between the estimated sound pressure in the first sub-area and a target sound pressure desired in the first sub-area, said target sound pressure being defined beforehand,
and, applying respective weights to the control signals of the loudspeakers on the basis of said degradation, so that the sound pressure in the first sub-area reaches the target pressure,
the calculation of the sound pressure in the first sub-area and in the second sub-area respectively being implemented once again, as a function of the respective weighted control signals of the loudspeakers.

9. The method according to claim 2, wherein the chosen sound field is a first sound field, a second chosen sound field also being produced which is selectively audible in the second sub-area, and wherein in order to render the second sound field inaudible in the first sub-area, the loudspeakers being supplied with respective first control signals so that each one emits a continuous audio signal corresponding to the first chosen sound field, and with respective second control signals so that each one emits a continuous audio signal corresponding to the second chosen sound field,
wherein acts of the method according to claim 1 are applied to the first sub-area so as to render the second sound field inaudible in the first sub-area.

10. The method according to claim 1, wherein the number of iterations of the method, so that the sound pressure of the first sub-area reaches the target sound pressure desired in the first sub-area, is comprised between 10 and 1000, preferably between 200 and 800, and more preferably between 400 and 500.

11. The method according to claim 1, wherein each sub-area comprises at least one virtual microphone and two loudspeakers, and preferably each sub-area comprises at least ten virtual microphones and at least ten loudspeakers.

12. A spatialized sound reproduction system based on an array of loudspeakers, with a view to generating a chosen sound field which is selectively audible in a first predetermined sub-area of an area covered by the loudspeakers, said area further comprising a second sub-area in which the said chosen sound field is rendered inaudible, the loudspeakers being supplied with respective control signals so that each loudspeaker continuously emits an audio signal, and
wherein the spatialized sound reproduction system comprises:
a processing unit configured to perform iteratively and continuously:
estimating a sound pressure in the second sub-area, at least as a function of the respective control signals of the loudspeakers, and of a respective initial weight of the control signals of the loudspeakers,
calculating an error between the estimated sound pressure and a target sound pressure desired in the second sub-area,
and, calculating and applying respective weights to the control signals of the loudspeakers, on the basis of said error,
the sound pressure in the second sub-area being calculated once again, on the basis of the respective weighted control signals of the loudspeakers, each respective weight applied to a loudspeaker comprising a first term corresponding to a respective weight calculated in a previous iteration and a second term which is a function of the error.

13. A non-transitory computer-readable storage medium storing a computer program loadable into a memory associated with a processor, and comprising code portions for implementing a method for spatialized sound reproduction using an array of loudspeakers during the execution of said program by the processor, wherein the method is implemented to generate a chosen sound field which is selectively audible in a first predetermined sub-area of an area covered by the loudspeakers, said area further comprising a second sub-area in which chosen sound field is rendered inaudible, wherein, the loudspeakers being supplied with respective control signals so that each loudspeaker continuously emits an audio signal,
the code portions configuring the processor to perform iteratively and continuously:
estimating a sound pressure in the second sub-area, at least as a function of the respective control signals of the loudspeakers, and of a respective initial weight of the control signals of the loudspeakers, calculating an error between the estimated sound pressure and a target sound pressure desired in the second sub-area, and, calculating and applying respective weights to the control signals of the loudspeakers, on the basis of said error, the sound pressure in the second sub-area being calculated once again, on the basis of the respective weighted control signals of the loudspeakers, each respective weight applied to a loudspeaker comprising a first term corresponding to a respective weight calculated in a previous iteration and a second term which is a function of the error.

\* \* \* \* \*